US006918033B1

(12) United States Patent
Cho

(10) Patent No.: US 6,918,033 B1
(45) Date of Patent: Jul. 12, 2005

(54) MULTI-LEVEL PATTERN HISTORY BRANCH PREDICTOR USING BRANCH PREDICTION ACCURACY HISTORY TO MEDIATE THE PREDICTED OUTCOME

(75) Inventor: Jang-Ho Cho, Suwon (KR)

(73) Assignee: Samsung Electronics Co., Ltd. (KR)

( * ) Notice: Subject to any disclaimer, the term of this patent is extended or adjusted under 35 U.S.C. 154(b) by 381 days.

(21) Appl. No.: 09/693,157

(22) Filed: Oct. 20, 2000

(30) Foreign Application Priority Data

Oct. 21, 1999 (KR) ........................................ 1999-45786

(51) Int. Cl.⁷ ................................................. G06F 9/32
(52) U.S. Cl. ..................................... 712/240; 712/239
(58) Field of Search ................................. 712/240, 239

(56) References Cited

U.S. PATENT DOCUMENTS

| | | | |
|---|---|---|---|
| 5,564,118 A | * 10/1996 | Steely et al. ................. 712/240 |
| 5,860,017 A | 1/1999 | Sharangpani et al. | |
| 6,055,629 A | * 4/2000 | Kulkarni et al. ............. 712/239 |
| 6,092,187 A | * 7/2000 | Killian ......................... 712/239 |
| 6,484,256 B1 | * 11/2002 | Levitan et al. ............... 712/240 |
| 6,550,004 B1 | * 4/2003 | Henry et al. ................. 712/239 |

OTHER PUBLICATIONS

Rudolf F. Graf, Modern Dictionary of Electronics, 1984, Howard W. Sams & Company, 6th Edition, p. 648.*
International Conference on Parallel Architetcure and COmpilation Techniques, Branch Prediction Using Selective Branch Inversion, Srilatha Manne, Artur Klauser, and Dirk Grunwald, Oct. 12–16, 1999.*

Computer Organization and Design—The Hardware/Software interface, 2nd Edition, John L hennessy and David A Patterson, Morgan Kaufman Publishers, 1998.*

James E. Smith, "A Study of Branch Prediction Strategies", pp. 135–148.

Linley Gwennap, "New Algorithm Improves Branch Prediciton", pp. 17–21.

* cited by examiner

Primary Examiner—Eddie Chan
Assistant Examiner—Shane Gerstl
(74) Attorney, Agent, or Firm—Mills & Onello LLP

(57) ABSTRACT

A branch predictor outputs either a predicted conditional branch or an inverted predicted conditional branch as a final branch prediction outcome, in response to a predicted accuracy history signal based on one or more accuracy history bits. According to the accuracy history bit, it is determined whether the branch prediction outcome of the branch predictor is correct. If the predicted conditional branch is correct, the branch predictor outputs the predicted conditional branch, and if the predicted conditional branch is not correct, the branch predictor outputs the inverted predicted conditional branch, in response to the predicted accuracy history signal. For performing this process, the branch prediction appends an accuracy history table and a multiplexer to a conventional branch predictor, so that the branch prediction according to the present invention can reduce the misprediction with relatively simple circuitry and low hardware cost.

6 Claims, 2 Drawing Sheets

MULTI-LEVEL PATTERN HISTORY BRANCH PREDICTOR USING BRANCH PREDICTION ACCURACY HISTORY TO MEDIATE THE PREDICTED OUTCOME

This application relies for priority upon Korean Patent Application No. 1999-45786, filed on Oct. 21, 1999, the contents of which are herein incorporated by reference in their entirety.

FIELD OF THE INVENTION

The present invention relates to the field of computer system, and more particularly to a branch predictor using branch prediction accuracy history and efficient processing techniques for instruction streams which include conditional program flow instructions, such as branch instructions.

BACKGROUND OF THE INVENTION

Many microprocessors employ a technique known as hardware pipelining to increase instruction throughput by processing several instructions through different phases of execution concurrently. To maximize instruction execution efficiency, it is desirable to keep the instruction execution pipeline full (with an instruction being processed in each pipeline stage) as often as possible such that the pipeline produces useful output every clock cycle. However, whenever there has been a transfer of program flow control to another section of software code and instructions have been speculatively fetched and processed and it is determined that these instructions should not have been executed, the output from the pipeline is not useful.

Exceptions and program flow control instructions such as branch instructions provide examples of how the program flow control can be changed. Branch instructions, which may be conditional or unconditional and may transfer program flow control to a preceding or subsequent code section, are used for frequently encountered situations where a change in program flow control is desired.

A conditional branch instruction determines instruction flow based on the resolution of a specified condition. If A>B then branch to instruction X is an example of a conditional branch instruction. In this case, if A>B, program flow control branches to a code section beginning with instruction X, also referred to as the target code section. If A is not greater than B, the instructions sequentially following the branch instruction in the program flow, referred to as the sequential code section, are executed. In executing such conditional branch instruction, it is required to check a condition of the branch instruction for determining the next instruction. Thus, performance of a microprocessor including a central processing unit (CPU) may be adversely affected in pipeline procedures of the microprocessor requiring fast instruction fetch.

To solve the aforementioned problem, many microprocessors adopt a branch predictor (or a branch prediction logic), which operates to predict the outcome of a branch instruction before identifying a condition check of the branch instruction, based on a predetermined branch prediction approach. Thus, instructions are then speculatively fetched from either the target code section or the sequential code section based on the prediction indicated by the branch predictor. Therefore, a pipeline stall can be prevented. However, when a branch prediction is missed, many instructions from the incorrect code section may be in various stages of processing in the instruction execution pipeline. On encountering such a misprediction, instructions following the mispredicted conditional branch instruction in the pipeline (or multiple pipelines) are flushed, and instructions from the other correct code section are fetched. Flushing the pipeline creates bubbles or gaps in the pipeline. Several clock cycles may be required before the next useful instruction completes execution, and before the instruction execution pipeline produces useful output. Such an incorrect guess causes the pipeline to stall until it is refilled with valid instructions. This delay is called the mispredicted branch penalty.

To reduce above described misprediction ratio, various kinds of branch predictors are used. Among the branch predictors, a two-level branch predictor is likely to become more common. A P6 processor of Intel Corporation is the first to use a two-level branch algorithm to improve accuracy. This algorithm, first published by Tse-Yu Yeh and Yale Patt, has the potential to push accuracy well beyond the 90% level achieved by the best processors today.

FIG. 1 is a schematic diagram for illustrating a structure of a conventional two-level branch predictor. For example, the branch predictor is illustrated in FIG. 2 of *New Algorithm Improves Branch Prediction* by Linley Gwennap, Mar. 27, 1995, MICROPROCESSOR REPORT, pp. 17–21.

Referring to FIG. 1, the two-level branch predictor is composed of a branch history register (BHR) 10 and a pattern history table (PHT) 20. The branch history register 10 is used for recording the actions of the most recent k conditional branches. For example, a 1 stored in the branch history register 10 may denote a branch taken, and a 0 stored in the branch history register 10 may denote a branch not taken, respectively. The performed k conditional branches are called a pattern.

The pattern history table 20 is used for recording pattern history bits Sc, which are used for predicting a conditional branch of a branch instruction to be performed in response to each pattern. For example, the two-level branch predictor predicts a conditional branch I(Sc) in response to an entry of 10 stored in the pattern history table 20. The entry corresponds with a pattern 111010 stored in the branch history register 10. According to the predicted conditional branch I(Sc), the next instruction to the branch instruction is fetched. Referring to the Gwennap paper referenced above, a predicted conditional branch I(Sc) is determined by a most significant bit (MSB) of pattern history bits Sc stored in the pattern history table 20.

For example, on the assumption that a real conditional branch of the branch instruction is Rc, if a predicted conditional branch I(Sc) is different from the real conditional branch Rc, this case is called a prediction miss. In this case, execution of instructions following the mispredicted conditional branch I(Sc) are withdrawn.

According to the real conditional branch Rc, both data of the branch history register 10 and the pattern history bits Sc stored in the pattern history table 20 are changed. This process is described as follows. When a least significant bit (LSB) corresponding to the real conditional branch Rc of the branch instruction is stored to the branch history register 10, the remaining bits are shifted to the left. At this time, the pattern history bits Sc stored in the pattern history table 20 is updated in response to the real conditional branch Rc. For example, if the real conditional branch Rc is 1 denoting predict taken, the pattern history bits Sc are increased by 1, and if the real conditional branch Rc is 0 denoting predict not taken, the pattern history bits Sc are decreased by 1. The pattern history bits Sc can be composed of an up/down saturating counter as shown in *A Study of Branch Prediction*

Strategies, by J. Smith, May 1981, pp. 135–148. The saturating counter maintains a minimal value of pattern history bits Sc when the pattern history bits Sc are the minimal value, although the real conditional branch Rc is 0 denoting not taken. In addition, the saturating counter maintains a maximum value of pattern history bits Sc when the pattern history bits Sc are the maximum value, although the real conditional branch Rc is 1 denoting taken.

Although branch prediction accuracy may be improved or turned by using different branch prediction algorithms, mispredictions still occur. By the time a misprediction is identified, many instructions from the incorrect code section may be in various stages of processing in the instruction execution pipeline.

An example of a solution to the forgoing performance penalty relevant to mispredicting is disclosed in U.S. Pat. No. 5,860,017 to Sharangpani et al., issued on Jan. 12, 1999, entitled, "Processor and Method for Speculatively Executing Instructions from Multiple Instruction Streams Indicated by a Branch Instruction," which identifies branch instructions, which in relationship to other conditional branch instructions, have a relatively high likelihood of being mispredicted. In this case, once a condition in a branch instruction is identified as being unlikely to be predicted accurately, the processor fetches and decodes instructions from both target and sequential instruction streams indicated by the conditional branch instruction. However, the method proposed by Sharangpani et al. may cause performance deterioration by a resource conflict and may lead to high hardware cost, since the processor fetches both target and sequential instruction streams. Therefore, there is a need for a branch predictor capable of efficient processing of branch instructions by reducing prediction miss with a comparatively simple circuit configuration and low hardware cost.

SUMMARY OF THE INVENTION

It is therefore an object of the present invention to provide a branch predictor capable of efficiently processing branch instructions by reducing prediction misses with a comparatively simple circuit configuration and low hardware cost.

According to an aspect of the present invention, there is provided a branch predictor which includes branch prediction means for predicting a conditional branch of a branch instruction. A comparator generates a comparison signal by comparing the predicted conditional branch from the branch prediction means with a real conditional branch of the branch instruction. An accuracy history table stores an accuracy history of the predicted conditional branch. A first state transition logic generates an accuracy history bit to be stored to the accuracy history table in response to the comparison signal. A multiplexer outputs either the conditional branch or an inverted conditional branch as a final branch prediction outcome, in response to a predicted accuracy history signal based on the accuracy history bit.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT

In accordance with the invention, a branch predictor outputs either a predicted conditional branch or an inverted predicted conditional branch as a final branch prediction outcome, in response to a predicted accuracy history signal based on one or more accuracy history bits. According to the accuracy history bits, it is determined whether the branch prediction outcome of the branch predictor is correct. If the predicted conditional branch is correct, the branch predictor outputs the predicted conditional branch, and if the predicted conditional branch is not correct, the branch predictor outputs the inverted predicted conditional branch, in response to the predicted accuracy history signal.

Figure 1:
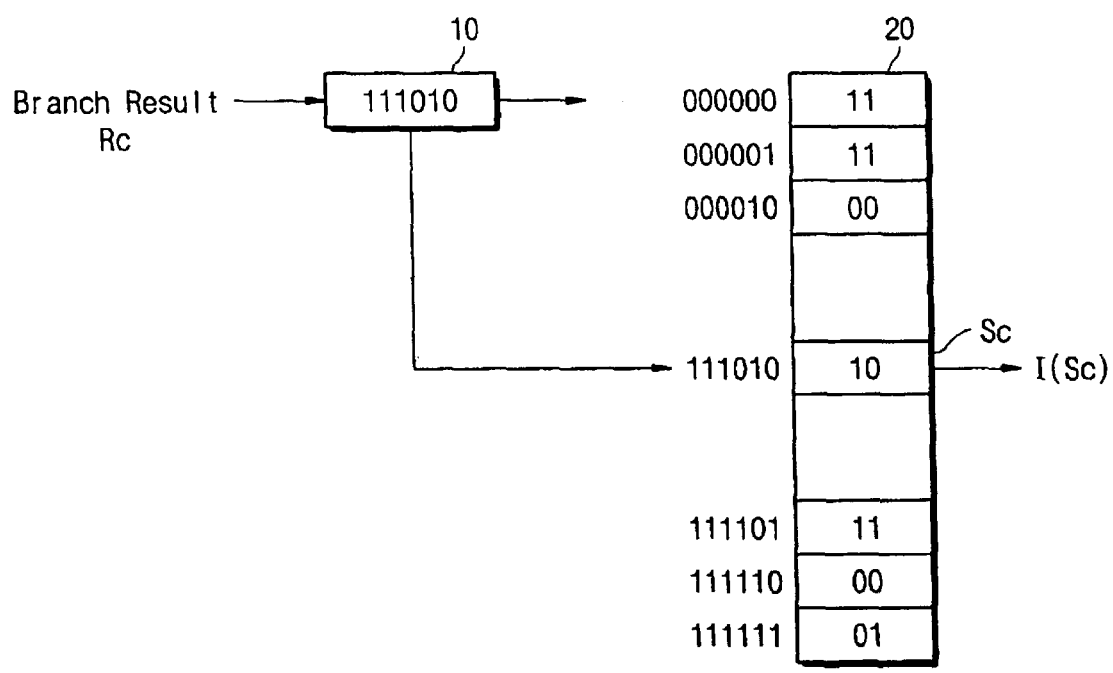
FIG. 1 is a schematic diagram illustrating a structure of a conventional two-level branch predictor.
Figure 2:
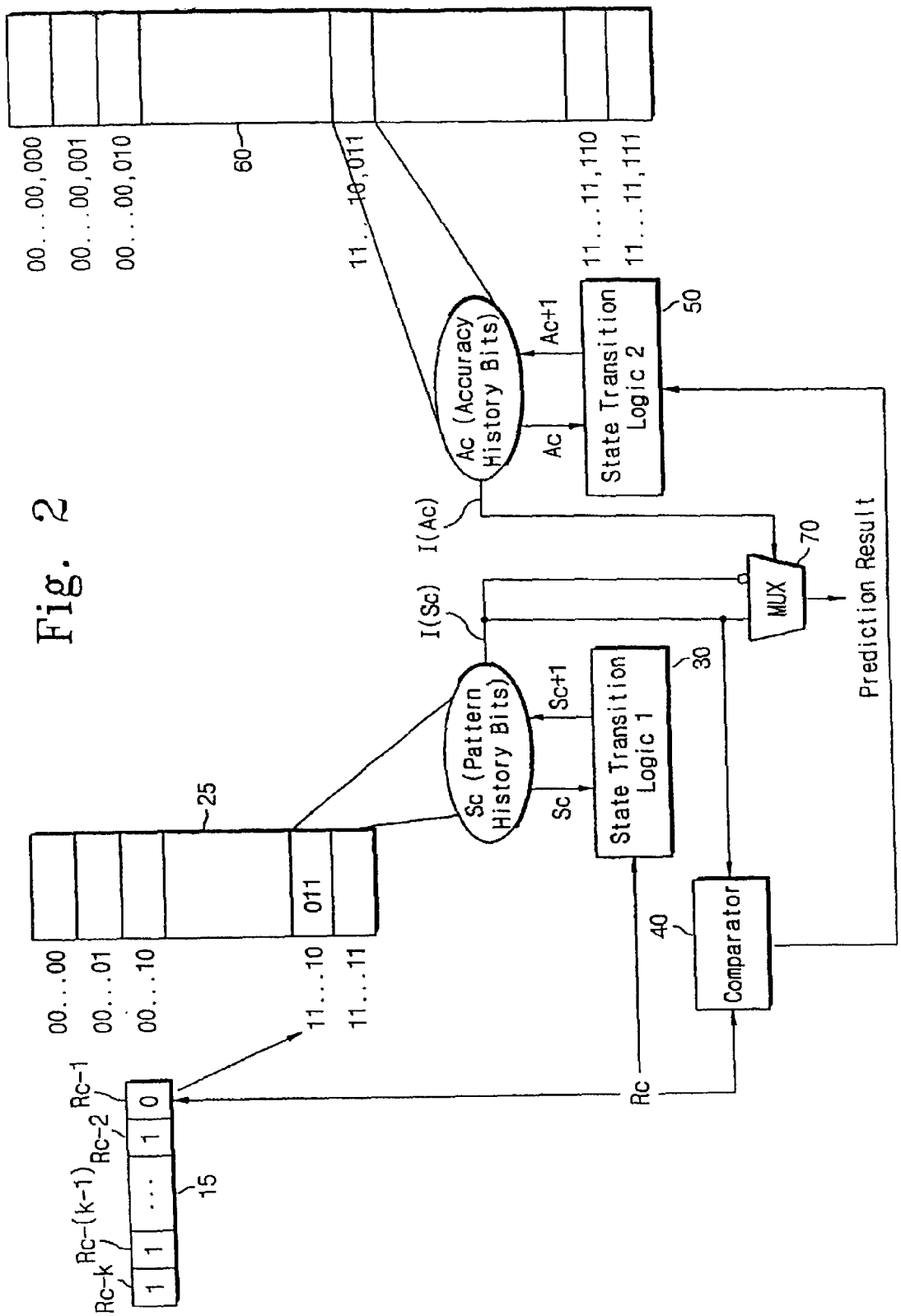
FIG. 2 is a schematic diagram illustrating a structure of one embodiment of a two-level branch predictor according to the present invention.

FIG. 2 is a schematic diagram illustrating a structure of one embodiment of a two-level branch predictor according to the present invention. Referring to FIG. 2, the two-level branch predictor comprises a branch history register 15 for recording actions of the most recent k conditional branches, a pattern history table 25 for recording pattern history bits Sc used for generating a predicted conditional branch I(Sc), and an accuracy history table 60 for recording accuracy history of the predicted conditional branch I(Sc). The accuracy history table 60 is composed of a memory array.

A first state transition logic circuit 30 generating pattern history bits Sc to be stored to the pattern history table 25 in response to a real conditional branch Rc is coupled to the pattern history table 25. In addition, a second state transition logic circuit 50 generating accuracy history bits Ac to be stored to the accuracy history table 60 is coupled to the accuracy history table 60.

Further, the branch predictor according to the present invention comprises a comparator 40 generating a comparison signal by comparing the predicted conditional branch I(Sc) generated by the pattern history bits Sc with the real conditional branch Rc of the branch instruction. The comparison signal is inputted to the second state transition logic circuit 50 to generate the accuracy history bits Ac. In addition, the branch predictor comprises a multiplexer 70 selecting either a predicted conditional branch I(Sc) or an inverted predicted conditional branch as a final branch prediction outcome or result. A predicted accuracy history signal I(Ac) based on the accuracy history bits Ac is used as a selection signal for the multiplexer 70. Operation of the branch predictor is described as follows.

A predicted conditional branch I(Sc) is generated in response to pattern history bits Sc corresponding to a pattern stored in the branch history register 15. The predicted conditional branch I(Sc) is inputted to the comparator 40 to be compared with a real conditional branch Rc.

The real conditional branch Rc has a 1 or 0 value according to "predict taken" or "predict not taken," respectively, and the value stored in the branch history register 15 is updated in response to the value of the real conditional branch Rc. According to the updated value of the branch history register 15, the pattern history bits Sc are updated. The first state transition logic circuit 30 updates the pattern history bits Sc. The first state transition logic circuit 30 is composed of an up/down saturating counter. In the first state transition logic circuit 30, the value of the pattern history bits Sc are increased by 1 when the real conditional branch Rc is 1 (i.e., taken), and the value of the pattern history bits Sc is decreased by 1 when the real conditional branch Rc is 0 (i.e., not taken).

The predicted conditional branch I(Sc) has a value of 1 or 0 in response to a most significant bit (MSB) of the pattern history bits Sc. The comparator 40 outputs 1 or 0 as a comparison signal to the second state transition logic circuit 50 by comparing the real conditional branch Rc and the predicted conditional branch I(Sc). For example, if the predicted conditional branch I(Sc) is the same as the real conditional branch Rc, the comparator 40 outputs 1, and if the predicted conditional branch I(Sc) is different from the real conditional branch Rc, the comparator 40 outputs 0.

The second state transition logic circuit 50 receiving the comparison signal determines accuracy history bits Ac to be stored to the accuracy history table 60 in response to the comparison signal. The second state transition logic circuit 50 is composed of an up/down saturating counter increasing the value of the accuracy history bits Ac by 1 when the predicted conditional branch I(Sc) is the same as the real conditional branch Rc, and decreasing the value of the accuracy history bits Ac by 1 when the predicted conditional branch I(Sc) is different from the real conditional branch Rc. The accuracy history bits Ac can be used after learning a branch accuracy of the corresponding pattern by monitoring the pattern.

According to the above described method, the accuracy history bits Ac are determined and stored to the accuracy history table 60. According to the accuracy history bits Ac, it can be determined whether a prediction result of the branch predictor is correct. For example, if pattern history bits Sc are 011 corresponding to a pattern 1110 stored in the branch history register 15, a predicted accuracy history signal I(Ac) is generated by an MSB of the accuracy history bits Ac. The predicted accuracy history signal I(Ac) is used for determining whether the predicted conditional branch I(Sc) is correct. For example, if it is considered as the predicted conditional branch I(Sc) is correct, the predicted accuracy history signal I(Ac) having a value of 1 is outputted to the multiplexer 70. Thus, the predicted conditional branch I(Sc) is outputted from the multiplexer 70 as a final prediction result. In addition, if it is considered as the predicted conditional branch I(Sc) is not correct, the predicted accuracy history signal I(Ac) having a value of 0 is outputted to the multiplexer 70. Thus, the inverted predicted conditional branch is outputted from the multiplexer 70 as a final prediction result. As described above, the predicted accuracy history signal I(Ac) is used as a selection signal of the multiplexer 70 selecting either the predicted conditional branch I(Sc) or an inverted predicted conditional branch as a final prediction outcome of the branch predictor.

As described above, the branch predictor according to the present invention outputs either a predicted conditional branch or an inverted predicted conditional branch as a final branch prediction outcome, in response to a predicted accuracy history signal based on accuracy history bits, so that the two-level branch predictor can reduce the misprediction and a microprocessor can process branch instructions more efficiently. In this case, the branch prediction according to the present invention merely appends the accuracy history table 60 and multiplexer 70 to the conventional branch predictor. Thus, the branch prediction according to the present invention can reduce the misprediction with relatively simple circuitry and low hardware cost.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A branch predictor comprising:
   a branch prediction generator for generating a predicted conditional branch of a branch instruction;
   a comparator for generating a comparison signal by comparing the predicted conditional branch from the branch prediction generator with a real conditional branch of the branch instruction;
   an accuracy history table for storing an accuracy history of the predicted conditional branch;
   a first state transition logic circuit for generating accuracy history bits to be stored to the accuracy history table in response to the comparison signal; and
   a multiplexer having a first input and a second input for receiving the predicted conditional branch and an inverted version of the predicted conditional branch, respectively, for selecting one of the predicted conditional branch and the inverted predicted conditional branch, and for outputting the selected one of the predicted conditional branch and the inverted predicted conditional branch as a final branch prediction outcome based on a state of a single selection input of the multiplexer; wherein
   a single, predicted accuracy history signal is applied to the single selection input of the multiplexer to select one of the predicted conditional branch and the inverted predicted conditional branch, the predicted accuracy history signal being a single most significant bit of the accuracy history bits and being directly applied to the single selection input of the multiplexer, such that the single accuracy history signal selects between the predicted conditional branch and the inverted predicted conditional branch to be output as the final branch prediction outcome.

2. The branch predictor according to claim 1, wherein the branch prediction means comprises:
   a branch history register for storing conditional branches of previous branch instructions;
   a pattern history table for storing pattern history bits used for generating the predicted conditional branch corresponding to the conditional branches of the previous branch instructions stored in the branch history register; and
   a second state transition logic circuit for generating the pattern history bits in response to the real conditional branch of the branch instruction.

3. The branch predictor according to claim 2, wherein the second state transition logic circuit includes an up/down saturating counter.

4. The branch predictor according to claim 1, wherein the comparator generates the comparison signal having a first logic value when the predicted conditional branch is the same as the real conditional branch, and generates the comparison signal having a second logic value when the predicted conditional branch is different from the real conditional branch.

5. The branch predictor according to claim 1, wherein the first state transition logic circuit includes an up/down saturating counter.

6. The branch predictor according to claim 5, wherein the first state transition logic circuit is used after learning the predicted branch accuracy of patterns of previous branch instructions.

* * * * *

UNITED STATES PATENT AND TRADEMARK OFFICE
CERTIFICATE OF CORRECTION

PATENT NO.    : 6,918,033 B1
DATED         : July 12, 2005
INVENTOR(S)   : Jang-Ho Cho It is certified that error appears in the above-identified patent and that said Letters Patent is hereby corrected as shown below:

<u>Column 6,</u>
Line 27, delete "," between "single" and "predicted".

Signed and Sealed this

First Day of November, 2005

JON W. DUDAS
*Director of the United States Patent and Trademark Office*